United States Patent
Narasimhan et al.

(10) Patent No.: US 11,620,347 B2
(45) Date of Patent: Apr. 4, 2023

(54) METHOD AND APPARATUS THAT COLLECT AND UPLOADS IMPLICIT ANALYTIC DATA

(71) Applicant: Google Technology Holdings LLC, Mountain View, CA (US)

(72) Inventors: Nitya Narasimhan, Hopewell Junction, NY (US); Yan Liu, Hanover Park, IL (US); Gregory L. Singer, Arlington Heights, IL (US)

(73) Assignee: Google LLC, Mountain View, CA (US)

( * ) Notice: Subject to any disclaimer, the term of this patent is extended or adjusted under 35 U.S.C. 154(b) by 1548 days.

(21) Appl. No.: 15/617,532

(22) Filed: Jun. 8, 2017

(65) Prior Publication Data

US 2017/0270214 A1    Sep. 21, 2017

Related U.S. Application Data

(63) Continuation of application No. 13/314,230, filed on Dec. 8, 2011, now Pat. No. 9,679,061.

(51) Int. Cl.
  *G06F 16/953* (2019.01)
  *G06Q 30/02* (2012.01)
  *G06F 16/9535* (2019.01)

(52) U.S. Cl.
  CPC ......... *G06F 16/9535* (2019.01); *G06Q 30/02* (2013.01)

(58) Field of Classification Search
  CPC .............. G06Q 30/02; G06Q 30/0269; G06Q 30/0267; G06Q 30/0277; G06Q 30/0255; G06Q 30/0272; G06F 16/9535

(Continued)

(56) References Cited

U.S. PATENT DOCUMENTS 6,947,922 B1 *   9/2005   Glance ................... G06Q 30/02
                                                                705/26.1
6,988,134 B2     1/2006   Thorpe et al.
(Continued)

FOREIGN PATENT DOCUMENTS

WO        9939263 A1     8/1999
WO     2010088217 A1     8/2010

OTHER PUBLICATIONS

"Chinese Blogs Approaching Our Products, Technology and Culture", Google China Blog, Approaching Our Products, Technology and Culture; Retrieved from https://china.googleblog.com/2013/05/google.html, May 8, 2013, 3 pages.

(Continued)

*Primary Examiner* — Alford W Kindred
*Assistant Examiner* — Cecile H Vo
(74) *Attorney, Agent, or Firm* — Colby Nipper PLLC

(57) ABSTRACT

A method (300) and apparatus (110, 150) collect and upload implicit analytic data. The method can include storing (320) dependency rules corresponding explicit events to implicit events. The method can include collecting (330) and storing (340) implicit event data corresponding to implicit events. The method can include receiving (350) an explicit event at the device. The method can include evaluating (360) dependency rules corresponding to the explicit event. The method can include identifying (370) a relevant subset of implicit event data corresponding to the explicit event based on evaluating the dependency rules. The method can include uploading (390) the relevant subset of the implicit event data and explicit event data corresponding to the explicit event.

29 Claims, 7 Drawing Sheets

(58) Field of Classification Search
USPC .................. 707/694; 705/714.66, 14.53
See application file for complete search history.

(56) References Cited

U.S. PATENT DOCUMENTS

| | | | |
|---|---|---|---|
| 7,203,623 | B2 | 4/2007 | Garcea et al. |
| 7,421,419 | B2 | 9/2008 | Maren |
| 7,551,922 | B2 | 6/2009 | Roskowski et al. |
| 7,797,338 | B2 | 9/2010 | Feng et al. |
| 7,810,156 | B2 | 10/2010 | Dubé et al. |
| 8,090,621 | B1 | 1/2012 | Chakrabarti et al. |
| 9,405,752 | B2 | 8/2016 | Collins et al. |
| 9,471,566 | B1 | 10/2016 | Zhang et al. |
| 9,679,061 | B2 | 6/2017 | Narasimhan et al. |
| 2003/0191685 | A1 | 10/2003 | Reese |
| 2007/0179835 | A1* | 8/2007 | Ott, IV ............... G06Q 50/01 705/306 |
| 2007/0260635 | A1* | 11/2007 | Ramer ............... H04L 67/5651 |
| 2008/0214162 | A1* | 9/2008 | Ramer ............... G06F 16/635 455/414.2 |
| 2008/0235084 | A1 | 9/2008 | Quoc et al. |
| 2008/0249961 | A1* | 10/2008 | Harkness ......... H04N 21/26603 707/999.005 |
| 2009/0105991 | A1 | 4/2009 | Ramacher et al. |
| 2009/0106596 | A1 | 4/2009 | Fallen et al. |
| 2010/0198757 | A1 | 8/2010 | Cheng et al. |
| 2010/0211575 | A1 | 8/2010 | Collins et al. |
| 2011/0227947 | A1 | 9/2011 | Benko et al. |
| 2013/0053005 | A1* | 2/2013 | Ramer ............... H04W 4/025 455/414.1 |
| 2013/0151486 | A1* | 6/2013 | Narasimhan ....... G06F 16/9535 707/694 |
| 2019/0251117 | A1 | 8/2019 | Sharifi |

OTHER PUBLICATIONS

Zhang, et al., "Partial-Candidate Commit for Chinese Pinyin Text Entry", Technical Disclosure Commons; Retrieved from https://www.tdcommons.org/dpubs_series/3300, Jun. 8, 2020, 9 pages.

"Compilation of Media Consumption for User Enjoyment", Technical Disclosure Commons, Nov. 20, 2020, 6 pages.

"Final Office Action", U.S. Appl. No. 13/314,230, dated Jan. 30, 2014, 16 pages.

"Non-Final Office Action", U.S. Appl. No. 13/314,230, dated Jul. 5, 2013, 14 pages.

"Notice of Allowance", U.S. Appl. No. 13/314,230, dated Feb. 7, 2017, 10 pages.

* cited by examiner

METHOD AND APPARATUS THAT COLLECT AND UPLOADS IMPLICIT ANALYTIC DATA

CROSS-REFERENCES TO RELATED APPLICATIONS

This Application is a continuation of, and claims benefit under 35 U.S.C. § 120 of, U.S. patent application Ser. No. 13/314,230 entitled "Method and Apparatus that Collect and Uploads Implicit Analytic Data," filed 8 Dec. 2011, the contents of which is incorporated by reference in its entirety as if fully set forth below.

BACKGROUND

1. Field

The present disclosure is directed to a method and apparatus that collect and uploads implicit analytic data. More particularly, the present disclosure is directed to uploading implicit event data corresponding to an explicit event based on dependency rules.

2. Introduction

Communication devices used in today's society include mobile phones, smartphones, set-top boxes, personal digital assistants, portable computers, desktop computers, gaming devices, and various other electronic communication devices. Data analysis and user profiling involves the collection of extensive analytic data, such as system, application, and user activity events, across such communication devices and other services. Because of the quantity of data involved, continuous or real-time uploads of data analysis and other user profiling information incur overheads, such as increased device cost, increased processing requirements, reduced battery life, increased bandwidth requirements, and other overheads. These overheads adversely impact a device user's experience, such as by reducing the available processing power, particularly on mobile devices, such as mobile phones, personal digital assistants, and tablets. As a result, most solutions today focus on batched updates of analytic data to a server.

Analytic data falls into two categories. The first analytic data category includes implicit event data gathered without user awareness or intervention. The implicit event data can be gathered from application, network, or system events on devices that the user is engaging with.

The second analytic data category is explicit data gathered from user activities. The explicit data is generated based on user actions with an application or service and the explicit data generation is observable to that user. This results in the user expecting to see related reactions occurring in response the user's actions in real time. For example, if a user selects an option to "Like" a program, the user may expect to see an analytics counter for the "Likes" increase immediately. As another example, if a user "Rates" a program, the user may expect to see an immediate reflection on the average rating based on the user's input. As a further example, if a user "Checks in" to a program, the user expects to see a notification of a promised reward instantly. These real time reactions allow a user to associate the right context with the user's feedback responses. Otherwise, the user may not make the appropriate association between the action and the reaction. For example, if user checks-in to a system during a television program and is allocated a reward, but is not notified until the next day while the user is watching a different program, the user may incorrectly associate the reward with the latter program.

A further problem exists in that additional knowledge or awareness of relevant implicit events is required when processing an explicit event order to deliver a correct response. If the relevant implicit events are not known, the correct response will not occur. For example, a system may weight an activity associated with explicit events based on additional evidence or context provided by related implicit events. To elaborate on a particular example, a rating service may look at a user's "Like/Dislike" vote (an explicit event) to associate a rating from that user for corresponding content. If Alice and Bob both vote "Like" for the same movie, but Alice does so after watching only 5 minutes, while Bob does so after watching the whole movie, the rating service should know the movie watching duration information and adjust ratings accordingly. Such information on how long they watched the movie is captured by the implicit event data from a channel change event or media-player "start" and "stop" events. The system should then give Alice's vote a 4.0 rating as compared to Bob's 5.0 rating, or at least weight their ratings proportional to their duration of movie watching, based on the fact that Alice's opinion was only based on a segment of the content. Thus, a system may weight an activity to adjust explicit events based on implicit events.

A system may also cheat proof explicit events based on implicit events. For example, if a content provider establishes a limited reward of $100 gift certificates to the first 100 "check-ins" to a show, then it is vital to validate every check-in to ensure that the corresponding user actually did watch the related show. However, such cheat-proofing is not always required. For example, if the user simply posts a comment on a movie or show and there is no limited reward for posting a comment, then verification of the user's viewing context is less critical, is more acceptable, and does not require any implicit event data for correlation. Even so, cheat proofing is required in certain contexts when explicit activity is entered and uploaded.

Naïve systems can address such requirements by always uploading implicit events with the occurrence of every explicit event. However, such unconditional uploads drive up costs in storage, battery, and network usage without always providing the desired utility. In particular, present systems do not upload implicit analytic data based on explicit activity. Thus, there is a need for a system and method that uploads implicit analytic data based on explicit activity, which allows for more efficient upload of implicit event data based on the presence or absence of relevant explicit user activity, and which provides timely and correct responses to user actions where the implicit event data may be acquired from one or more devices contextually-related to the explicit event.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

A method and apparatus upload implicit analytic data based on explicit activity. The method can include storing dependency rules corresponding explicit events to implicit events. The method can include collecting and storing implicit event data corresponding to implicit events. The method can include receiving an explicit event at the device. The method can include evaluating dependency rules corresponding to the explicit event. The method can include identifying a relevant subset of implicit event data corresponding to the explicit event based on evaluating the dependency rules. The method can include triggering upload of the relevant subset of the implicit event data in response to the explicit event. The method can include uploading, from the device, the relevant subset of the implicit event data and explicit event data corresponding to the explicit event.

Figure 1:
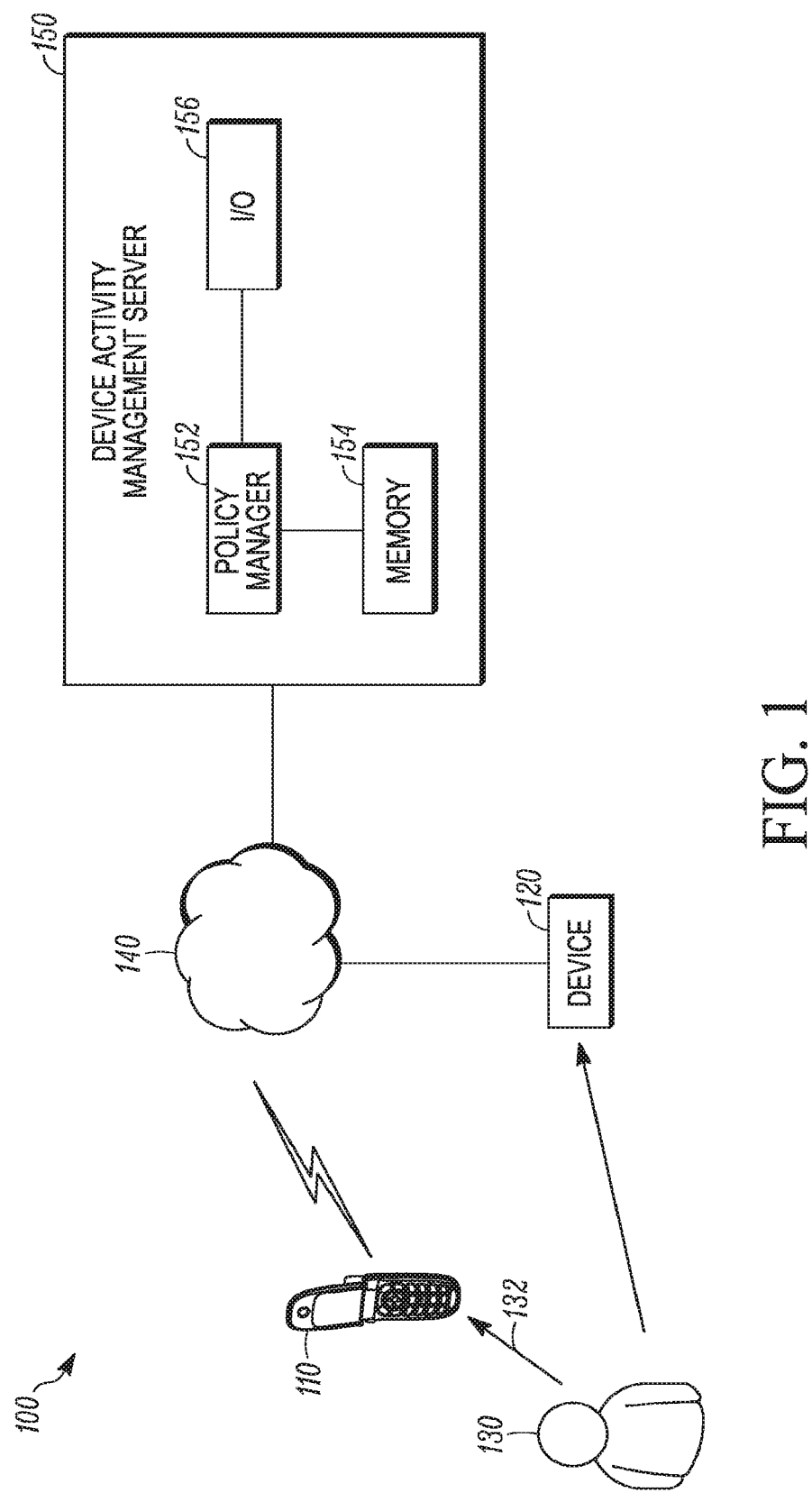
FIG. 1 is an example block diagram of a system according to one possible embodiment.

FIG. 1 is an example block diagram of a system 100 according to one possible embodiment. The system 100 can include a user device 110 of a user 130, a secondary device 120 related to the user 130, a network 140, and a device activity management server 150. The device activity management server 150 can include a policy manager 152, a memory 154, and an input and output module 156.

The user device 110 can be a wireless communication device including cellular and/or other wireless communication circuitry, such as Code Division Multiple Access (CDMA) circuitry, Long Term Evolution (LTE) circuitry, Universal Mobile Telecommunications System (UMTS) circuitry, Time Division Multiple Access (TDMA) circuitry, Wireless Local Network Circuitry, short range wireless circuitry, wired communication circuitry, Global Positioning System (GPS) circuitry, and/or other wireless communication circuitry. For example, the user device 110 can be a mobile phone, a personal digital assistant, a tablet, or any other communication device that allows a user to communicate or perform applications using the user device 110. As a further example, the user device 110 can be a navigation device, a laptop computer, a set-top box, a desktop computer, a gaming device, an entertainment device, a pager, a selective call receiver, or any other device that is capable of sending and receiving communication signals over a network, such as the network 140.

The network 140 may include any type of network that is capable of sending and receiving signals. For example, the network 140 may include a wireless telecommunications network, a cellular telephone network, a CDMA network, a LTE network, a UMTS network, a TDMA network, a satellite communications network, a packet-switched network, an Ethernet network, the Internet, and other communications systems. Furthermore, the network 120 may include more than one network and may include a plurality of different types of networks.

In operation, the input and output module 156 can receive and send data. For example, the input and output module 156 can receive dependency rule data from an input or from a service provider. The dependency rule data can be stored in the memory 154. The policy manager 152 can use the dependency rule data to generate dependency rules. Dependency rules can associate explicit events with relevant implicit events. The dependency rules can determine which subset of implicit events correspond to explicit events and can determine which corresponding implicit event should be collected or sent in response to an explicit event. The device activity management server 150 can send the dependency rules to the user device 110 and to the secondary device 120 via input and output module 156 and via the network 140.

A user 130 can perform an explicit event 132, such as an action of directly entering data into the user device 110. Any event, explicit or implicit, can be an observable change in a device 110 or 120 related state. The user 130 can expect feedback from the user device 110 in response to the explicit event 132, such as by receiving acknowledgement of received data by the user device 110 or by a service provider. The user device 110 can also monitor and record implicit events, such as user activity that is recorded in the background and that does not require feedback to the user. The secondary device 120 can also record and store explicit and implicit events of the user 130. The user device 110 can use the dependency rules to decide which implicit event data is relevant to the explicit event 132. The user device 110 can then send the relevant implicit event data in response to the explicit event instead of sending all collected implicit event data at once in a periodic batch upload. For example, the user device 110 can determine which implicit event data to send and when sending the implicit event data is necessary.

For example, on occurrence of any explicit event, the user device 110 can automatically evaluate any associated dependency rules for that event to identify relevant implicit event data and can trigger the appropriate upload actions. Dependency rules, such as upload policies, can be created and enforced by the device activity management server 150. The upload policies can establish dependencies between an explicit event, such as a user liking something, checking in for something, or other explicit events, and an implicit event, such as the user playing something, the location of the user, the duration of playing something, and other implicit events.

Figure 2:
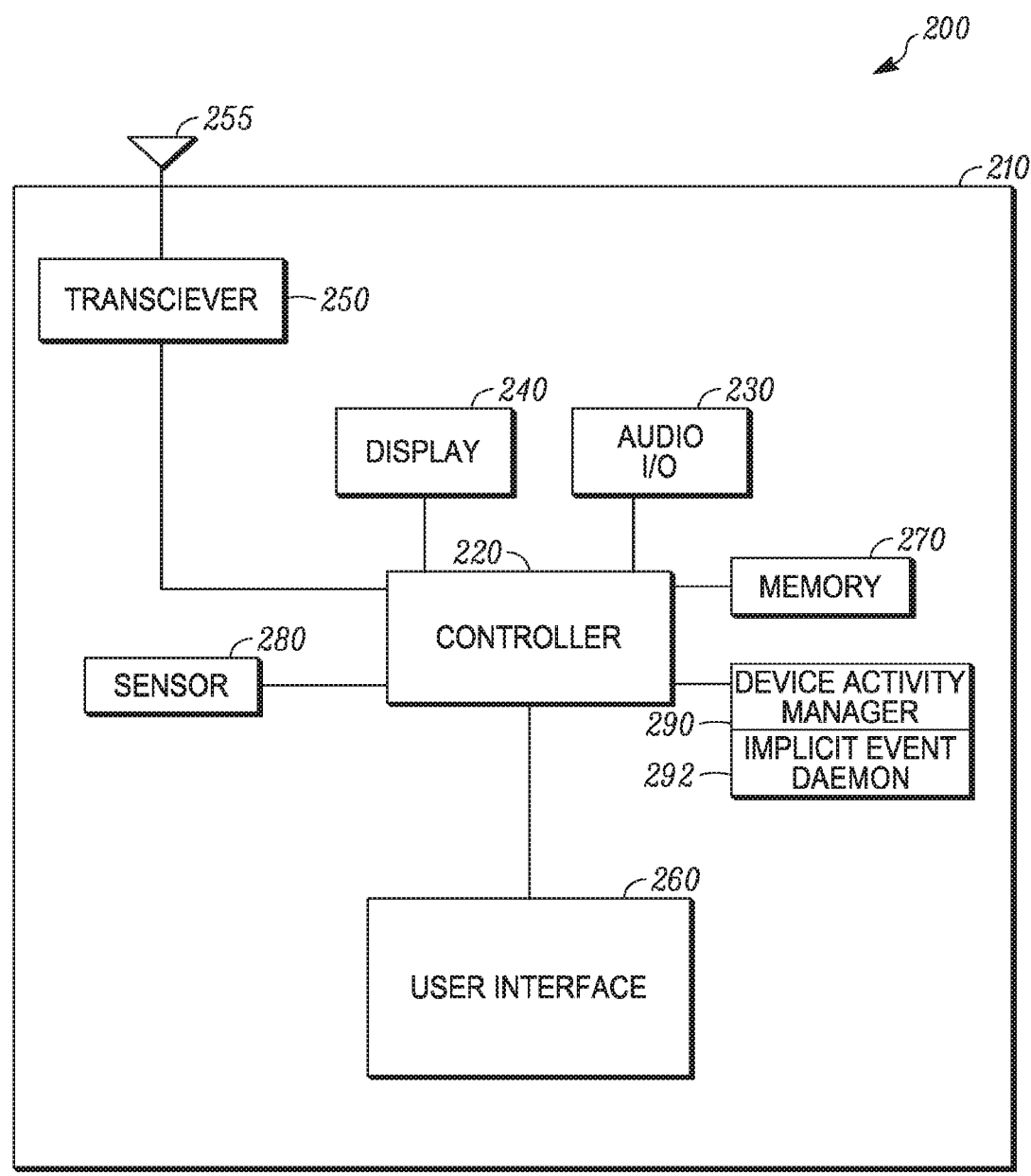
FIG. 2 is an example block diagram of a communication device according to a possible embodiment.

FIG. 2 is an example block diagram of a communication device 200, such as the user device 110, according to a possible embodiment. The communication device 200 can include a housing 210, a controller 220 located within the housing 210, audio input and output circuitry 230 coupled to the controller 220, a display 240 coupled to the controller 220, a transceiver 250 coupled to the controller 220, an antenna 255 coupled to the transceiver 250, a user interface 260 coupled to the controller 220, and a memory 270 coupled to the controller 220. The communication device 200 can also include a device activity manager 290 and an implicit event daemon 292. The device activity manager 290 and the implicit event daemon 292 can be coupled to the controller 220, can reside within the controller 220, can reside within the memory 270, can be autonomous modules, can be software, can be hardware, or can be in any other format useful for a module for a communication device 200.

The display 240 can be a liquid crystal display (LCD), a light emitting diode (LED) display, a plasma display, a touch screen display, a projector, or any other means for displaying information. Other methods can be used to present information to a user, such as aurally through a speaker or kinesthetically through a vibrator. The transceiver 250 may include a transmitter, a receiver, or a combination thereof. The transceiver can transmit and receive wireless communication signals, wired communication signals, or a combination thereof. The audio input and output circuitry 230 can include a microphone, a speaker, a transducer, or any other audio input and output circuitry. The user interface 260 can include a keypad, buttons, a touch pad, a joystick, an additional display, a touch screen display, or any other device useful for providing an interface between a user and an electronic device. The memory 270 can include a random access memory, a read only memory, an optical memory, a subscriber identity module memory, flash memory, or any other memory that can be coupled to a communication device.

In operation, the controller 220 can control operations of the communication device 200. The controller 220 can collect implicit event data corresponding to implicit events. For example, the implicit event daemon 292 can collect implicit event data corresponding to implicit events. Implicit events can include actions tracked by the communication device 200 without the expectation of a response, expectation of a direct result, or expectation of a user seeing or being aware of the transmission. Implicit events can be tracked and relevant implicit event data can be stored or sent in the background without user action that explicitly directs the communication device 200 to perform an action for the implicit event.

The memory 270 can store implicit event data and can store dependency rules that correspond explicit events to implicit event data. An explicit event can be a user action at the communication device 200. The user can perform the explicit event action where the user explicitly sends information to a service where the user knows the information is being sent. At least some of the stored implicit event data can be collected in response to an explicit event.

The dependency rules and the implicit event data can be stored in the memory 270 or can be stored elsewhere, such as at a server. Dependency rules can associate explicit events with relevant implicit events. The dependency rules can determine which subset of implicit events correspond to explicit events and determine which corresponding implicit events should be collected or sent in response to an explicit event. For example, according to one dependency rule, implicit event data of a similar type to an explicit event data type can be pushed together with the explicit event data. According to another dependency rule, implicit event data can be pushed for given application receiving a given explicit event. According to another dependency rule an explicit event can be cheat-proofed by using implicit event data, which is described in more detail in other embodiments. The dependency rules can be specified by a service provider other than the user of the device.

The user interface 260 can receive an explicit event, such as an explicit event user input. The explicit event user input can be directly input to the user interface 260 or can be indirectly input to the user interface 260. For example, the explicit event user input can be input to the user interface 260 via another device, such as a companion device, a remote control, or any other way of directly or indirectly generating an explicit event at a device. Thus, an explicit event can be an explicit event user input directly corresponding to an explicit event user action. Thus, the explicit event is user-generated and is explicit. Furthermore, a user can enter an explicit event on a first device and the first device can forward the explicit event to multiple devices. The multiple devices may be proximal to the first device and the multiple devices can gather implicit events relevant to the user and relevant to the explicit event. For example, a user can see an advertisement on television, launch a browser on the user's personal computer, and view a page corresponding to the advertisement. Then such information, including explicit and implicit event information, can be captured as proof that the user viewed the advertisement.

The device activity manager 290 can evaluate dependency rules corresponding to the explicit event user input. The device activity manager 290 can identify a relevant subset of implicit event data corresponding to the explicit event user input based on evaluating the dependency rules. The device activity manager 290 can trigger upload of the relevant subset of the implicit event data in response to the explicit event.

The transceiver 250 can upload the relevant subset of the implicit event data and upload explicit event data corresponding to the explicit event user input. The explicit event data can be data from the explicit event user input. The upload can be triggered by the explicit event user input. It is possible for the relevant subset of implicit event data, as required by the dependency rule, to comprise some events that were previously uploaded by a previous evaluation and others that are to be uploaded. In this case, only the remaining events or data from that subset may be uploaded, which can reduce overheads.

The transceiver 250 can concurrently upload the relevant subset of the implicit event data with the explicit event data. The concurrent upload may imply either strongly synchronized uploads, such as implicit and explicit events uploaded together from the same device, or simultaneous uploads, such as where implicit events are uploaded from the same or different devices within a given time window of the explicit event. Multiple devices that perform the upload may be notified of the explicit event and the dependency rules by device activity management server 150, such as after receipt of first upload from a source of an explicit event. Multiple devices that perform the upload may be notified of the explicit event and the dependency rules by the source of explicit event, such as directly in a peer-to-peer communication style. Multiple devices that perform the upload may also be notified separately of the explicit event and dependency rules, such as by peer-to-peer notification of the explicit event and server retrieval of the dependency rules. All devices receiving an explicit event from a backend service can be requested to send implicit event history data that are relevant to a given explicit event.

When explicit event data is received, the device activity manager 290 can process the explicit event data based on the implicit event data. For example, an explicit event user input can be a request from a user for a recommendation of music for the user. The implicit event daemon 292 can collect implicit event data, such as other music played on the device, sites visited from the device, videos watched from the device, and other implicit event data. The device activity manager 290 can then use the implicit event data to determine music recommendations for the user of the communication device 200. As another example, an explicit event user input can be a request from a user to "check in" to a location. The implicit event daemon 292 can collect implicit event data, such as periodic notifications of the user's current location that can be collected from any of a variety of sensors on the user device. In an embodiment where both types of input are supported, the device activity manager 290 can then use the collected implicit location data to verify whether the user has recently been near the location associated with the explicit "check-in" event. Based on the result of this evaluation, the device activity manager 290 can send an indication of whether the user honestly "checked in" to that location to the device activity management server 150, or any other remote entity. In this example, the device activity manager 290's evaluation of the relevant implicit event data can allow it to report whether the "check-in" was honest without having to upload any of the associated implicit data.

The device activity manager 290 can decide which implicit event data is relevant to an explicit event and can send the relevant implicit event data in response to the explicit event instead of sending all of the implicit event data at once. For example, the communication device 200 or another device, such as the device activity management server 150, can determine which implicit event data to send and when sending the implicit event data is necessary.

The device activity manager 290 can decide when it may be necessary to collect additional implicit event data in response to an explicit event. Continuing with the cheat-proofing example discussed previously, it is possible that the device activity manager 290 in that example may determine that it has not collected a sufficient amount of implicit event data to make either a positive or negative assertion as to whether the user of the device was at the location indicated in the explicit "check-in" event. In that case, the device activity manager 290 can instruct the implicit event daemon 292 to force a new round of data collection so that up-to-date location data can be made available. The newly-collected data can then be processed by the device activity manager 290 and/or sent to the device activity manager 150 along with the explicit "check-in" event for server-side processing.

The implicit event daemon 292 can collect implicit event data, can label the collected implicit event data with a category and at least one dependency rule, and can store the labeled implicit event data in the memory 270. The device activity manager 290 can use logic to choose a subset of the stored implicit event data that corresponds to an explicit event. The device activity manager 290 can sort explicit events with implicit events when choosing the subset of the stored implicit event data.

Some embodiments can provide a rules-based system that allows for the establishment of a dependency rule between an explicit event based on an actor, verb, target, or object type and an implicit event data stream based on an event type or time window, such that the occurrence and upload of the explicit event causes automated and concurrent upload of the relevant subset of the implicit event data stream in real-time, based on the effective dependency rule.

The dependency rules can be determined from historical usage of the communication device 200. For example, the dependency rules can be based on a historical inference between implicit and explicit events. The dependency rules can also be based on historical behavior of the user, such as if the user has bought a new device and the dependency rules can be based on the user's behaviors on other devices for comparison and learning. The device activity manager 290 can determine a high probability that a select subset of implicit event data corresponds to the explicit event user input based on the historical usage of the communication device 200. The device activity manager 290 can defer uploading the select subset of the implicit event data in response to determining a high probability that a select subset of implicit event data corresponds to the explicit event user input. For example, server-established dependencies may be short-circuited by clients based on confidence in the presence of the relevant subset of implicit events from historical or recent observation. This personalization can further reduce overheads. For example, if the dependency requires establishing that an explicit "Rate" event to rate a movie was preceded by at least one implicit "Play" event of the movie, and the user has historically always had this association succeed, then the communication device 200 may defer upload of events and data, and may return a condition-true response for immediate responses. As a further elaboration, the dependency rules may be personalized over time based on improved profiling or prediction of user behaviors. For example, for cheat-proofing, if user is repeatedly shown to be verifiably truthful with explicit activity, then the communication device 200 can reduce the window of required implicit events or can randomize inclusion of those events to reduce costs. Thus, a high probability of select subset of implicit event data corresponding to the explicit event user input can be determined based on a desired percentage, such as a play flag being true for a threshold percentage of explicit rating events. Also, a high probability of a select subset of implicit event data corresponding to the explicit event user input can be determined based on the implicit event data having a desired number, such as a threshold number of play values.

The dependency rules can be determined over a plurality of devices associated with a user of the communication device 200. For example, dependencies can be established in a device-specific or device-agnostic fashion. Thus, if a user has multiple devices associated with his identity, the explicit activity on one device can trigger collection and upload of related implicit events from all suitable devices covered by that dependency. For example, a "Like" event from a companion device can trigger upload of the last n events from a set-top box associated with the user, where the set-top box can contain the player events. Suitable devices can include all or some devices owned and/or used within a relevant time window.

The dependency rules may be related to the presence or absence of specified conditions. For example, a device can upload all prior events for 1 hour if they do not contain a "Play" event or can upload all events up to the last "Play" event. The dependency rules may be enforceable across multiple devices concurrently if those devices are contextually-related to the explicit activity, such as the user activity. For example, a device can upload implicit event data from both a mobile device and a television set-top box. The dependency rules can be established, overridden or adapted by a third party, such as by an incentive provider. The dependency rules can be inferred algorithmically by a system, such as by using machine learning based on historical domain or user event data. Enforced dependency rules can the union of all defined dependency rules for given explicit event. The dependency rules may include another explicit activity event and may enforce or update the related dependency rules for that event only in the context of a given capture instance.

The communication device 200 can include at least one implicit event sensor 280. The implicit event sensor 280 can receive an implicit event and can generate implicit event data corresponding to the implicit event. The implicit event sensor 280 can be a device location sensor, a motion sensor, a touch sensor, a proximity sensor, a network interface activity sensor, a battery level sensor, a signal strength sensor, a cellular identifier sensor, a processor load sensor, a memory usage sensor, a running application sensor, an application-specific state sensor, or any other sensor that can sense an implicit event at a communication device. The implicit event sensor 280 can use hardware that can provide data, such as raw global positioning system sensor data and software that can provide data, such as location application data that maps global positioning system data to an identified place.

To elaborate on an example embodiment, an event can represent some observable change in a communication device-related state and can be represented by a message containing related information, such as the source of the event, a timestamp of event, types of event, event-specific attributes, and other event-related information. Explicit events can be associated with user interface components, such as the user interface 260. The explicit events can be triggered by user actions on the user interface 260 and thus, can have finite occurrences. For example, the user interface 260 can be a user gesture interface, a user speech interface, a user touch interface, or any other user interface that can receive a user explicit event input. The user interface 260 can receive explicit actions, such as a play action for a movie, a like action for a movie, a rate action for a movie, a post action for commenting on media, a speak action for a query, a launch action for an application, or any other explicit action.

Figure 3:
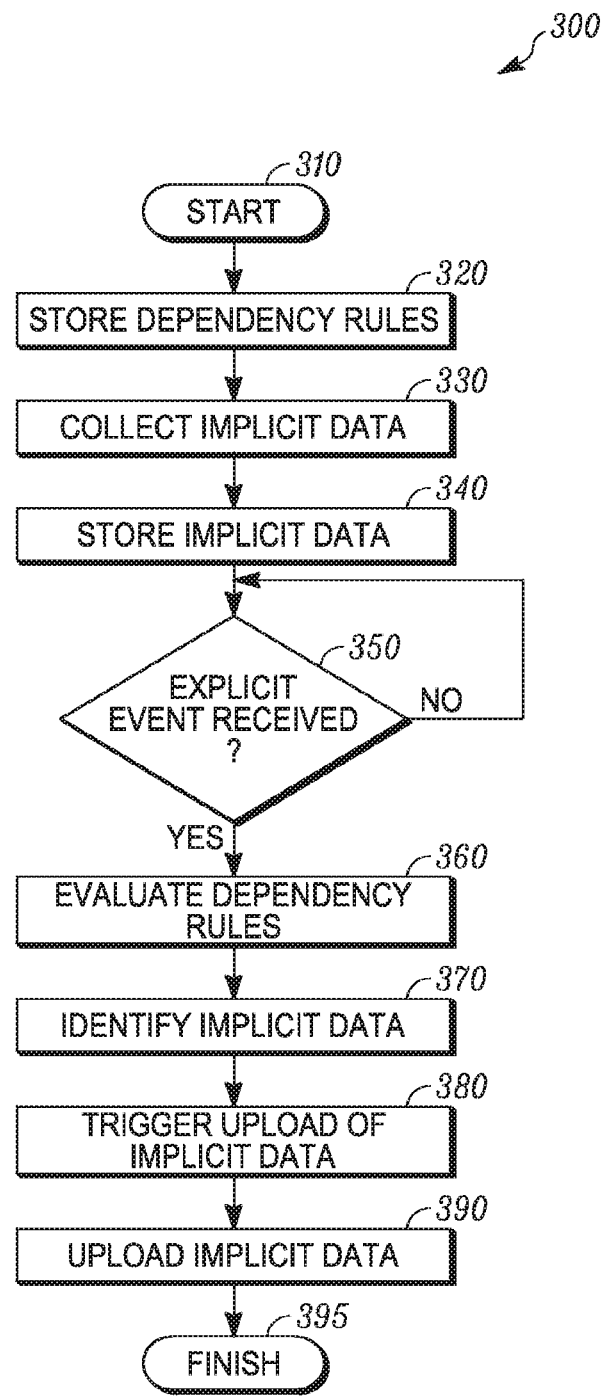
FIG. 3 illustrates an example flowchart illustrating the operation of the communication device of FIG. 2 according to one possible embodiment.

Implicit events can be associated with the implicit event sensor 280 that can include system sensors, network sensors, application sensors, environmental sensors, and other implicit event sensors. The implicit events can be auto-triggered by the implicit event sensor 280, such as by activity monitors or based on detected state changes or defined policies, and can thus have infinite occurrences. Implicit events can be transparent to a user by occurring continuously in the background or while explicit events occur with user's complete awareness. Implicit events may be a precursor to, or a side-effect of, an explicit event. For example, an implicit event can be likely to indicate that a relevant user interface was rendered before an explicit event of "Like" is registered. After the user clicks "Like", a subsequent implicit event may occur indicating that the data network was in use, given that the "Like" was transmitted to a remote server. FIG. 3 illustrates an example flowchart 300 illustrating the operation of a device, such as the communication device 200 according to one possible embodiment. At 310, the flowchart can begin.

At 320, dependency rules can be stored or the dependency rules can be downloaded from a remote server. The dependency rules can correspond explicit events to implicit events. The dependency rules can be specified by a service provider other than the user of a device. Alternately, or additionally, a user or other entity may be able to define dependency rules. The dependency rules can be determined over a plurality of devices associated with a user of the device. For example, a relevant subset of implicit event data may be acquired from multiple sources that are deemed contextually relevant to an explicit event occurrence. The dependency rules can be determined from historical usage of the device or can be otherwise determined.

At 330, implicit event data can be collected at a device. The implicit event data can correspond to implicit events. Implicit event data corresponding to implicit events can be collected in response to receiving explicit event user input at the device, can be regularly collected, or can be collected in response to other events. At 340, the implicit event data can be stored. At 350, the device can determine if explicit event user input has been received at the device. If the explicit event user input has not been received, the method can continue to await explicit event user input. If the explicit event user input has been received, at 360, dependency rules corresponding to the explicit event user input can be evaluated.

At 370, a relevant subset of implicit event data corresponding to the explicit event user input can be identified based on evaluating the dependency rules. The relevant subset of the implicit event data can be a unique subset of a desired subset of implicit events that are actually available for upload. For example, the unique subset of the desired subset of implicit events can be a non-redundant subset of the desired subset of implicit events. As a further example, if a prior explicit event caused the upload of implicit event data that is also required for the current explicit event, then only new implicit events may be identified and uploaded. A server can automatically update required subset criteria to reflect data it already knows about.

At 380, upload of the relevant subset of the implicit event data can be triggered in response to the explicit event. Uploading can include concurrently uploading the relevant subset of the implicit event data along with the explicit event data. At 390, the relevant subset of the implicit event data and explicit event data corresponding to the explicit event user input can be uploaded from the device. At 395, the flowchart 300 can finish.

According to some embodiments, all of the blocks of the flowchart 300 are not necessary. Additionally, the flowchart 300 or blocks of the flowchart 300 may be performed numerous times, such as iteratively. For example, the flowchart 300 may loop back from later blocks to earlier blocks. Furthermore, many of the blocks can be performed concurrently or in parallel processes.

Figure 4:
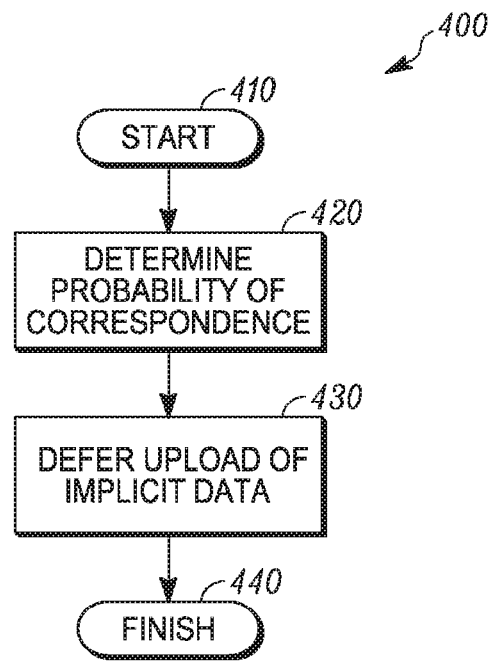
FIG. 4 illustrates an example flowchart illustrating the operation of the communication device of FIG. 2 according to one possible embodiment.

FIG. 4 illustrates an example flowchart 400 illustrating the operation of the communication device 200 according to one possible embodiment. At 410, the flowchart can begin. At 420, a high probability a select subset of implicit event data corresponds to the explicit event user input can be determined based on the historical usage of the device. At 430, uploading the select subset of the implicit event data can be deferred in response to determining a high probability of a select subset of implicit event data corresponding to the explicit event user input. At 440, the flowchart 400 can finish.

According to some embodiments, all of the blocks of the flowchart 400 are not necessary. Additionally, the flowchart 400 or blocks of the flowchart 400 may be performed numerous times, such as iteratively. For example, the flowchart 400 may loop back from later blocks to earlier blocks. Furthermore, many of the blocks can be performed concurrently or in parallel processes.

Figure 5:
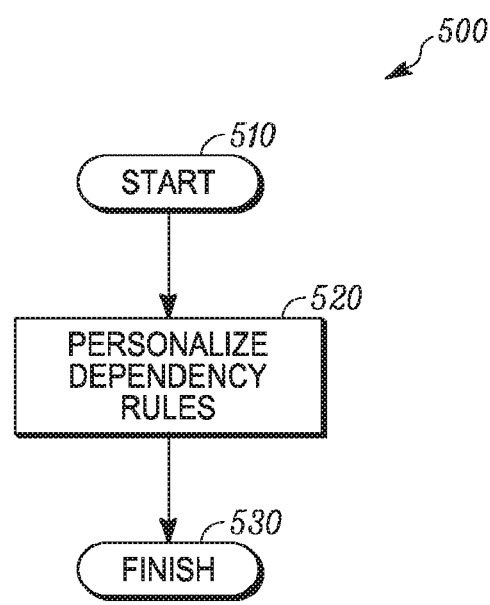
FIG. 5 illustrates an example flowchart illustrating the operation of the communication device of FIG. 2 according to one possible embodiment.

FIG. 5 illustrates an example flowchart 500 illustrating the operation of the communication device 200 according to one possible embodiment. At 510, the flowchart can begin. At 520, the dependency rules can be personalized based on implicit event data collected at the device. At 530, the flowchart 500 can finish.

Figure 6:
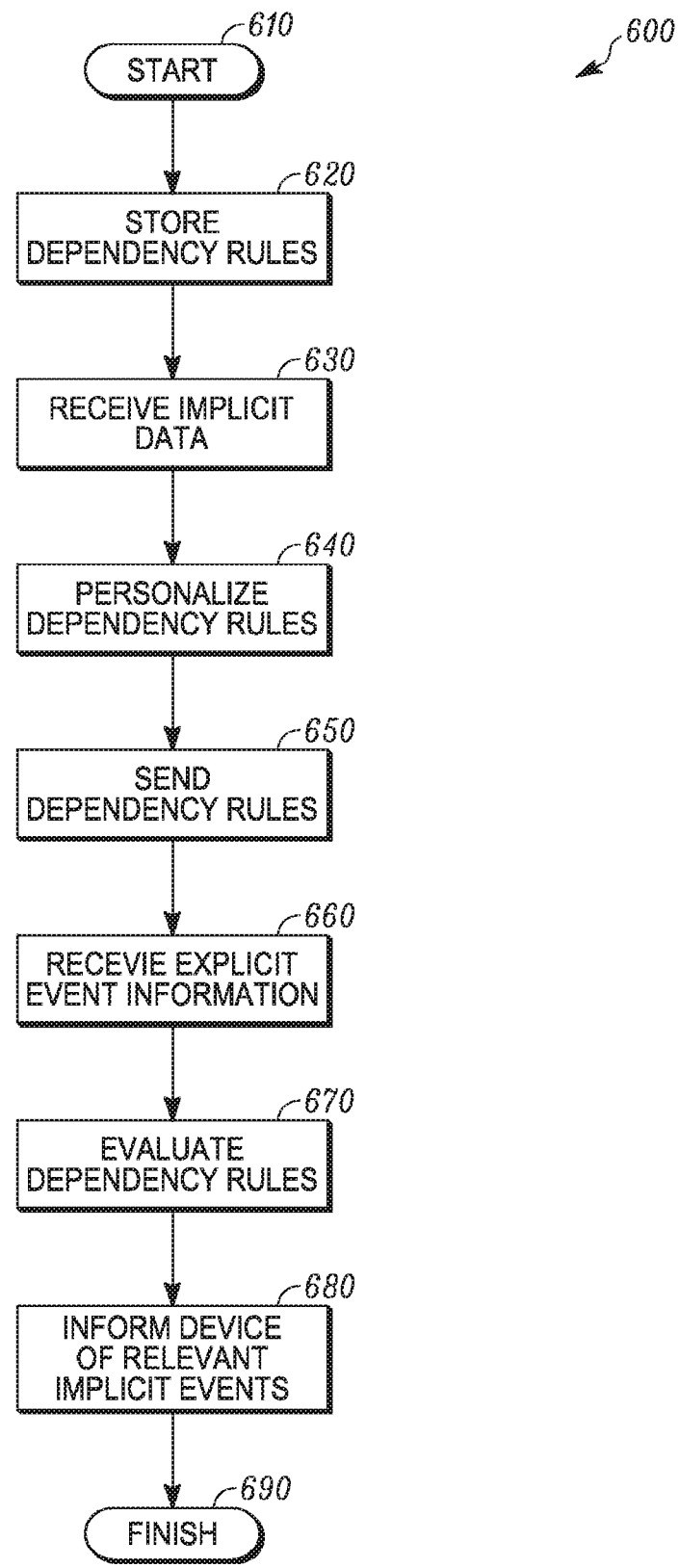
FIG. 6 illustrates an example flowchart illustrating the operation of a device activity management server according to one possible embodiment.

FIG. 6 illustrates an example flowchart 600 illustrating the operation of the device activity management server 150 according to one possible embodiment. At 610, the flowchart can begin. At 620, dependency rules can be stored at the device activity management server 150. The dependency rules can identify a relevant subset of implicit event data corresponding to an explicit event user input at a user device. At 630, implicit event data can be received at the device activity management server. The implicit data can be collected at the user device and can correspond to implicit events related to the user device. The implicit event data can also be collected at a plurality of user devices. At 640, the dependency rules can be personalized based on implicit event data collected at the user device. The dependency rules for a selected user device can be personalized based on implicit event data collected at the plurality of user devices. At 650, the dependency rules can be sent to the user device. At 660, information regarding an explicit event user input can be received. The information can be regarding an explicit event user input at the device. At 670, the dependency rules corresponding to the explicit event user input can be evaluated. At 680, the user device can be informed of relevant implicit events based on evaluating the dependency rules corresponding to the explicit event user input. For example, the device activity management server can inform the user device of relevant implicit events by sending the dependency rules corresponding to the explicit event user input to the user device. At 690, the flowchart 600 can finish.

According to some embodiments, all of the blocks of the flowchart 600 are not necessary. Additionally, the flowchart 600 or blocks of the flowchart 600 may be performed numerous times, such as iteratively. For example, the flowchart 600 may loop back from later blocks to earlier blocks. Furthermore, many of the blocks can be performed concurrently or in parallel processes.

Figure 7:
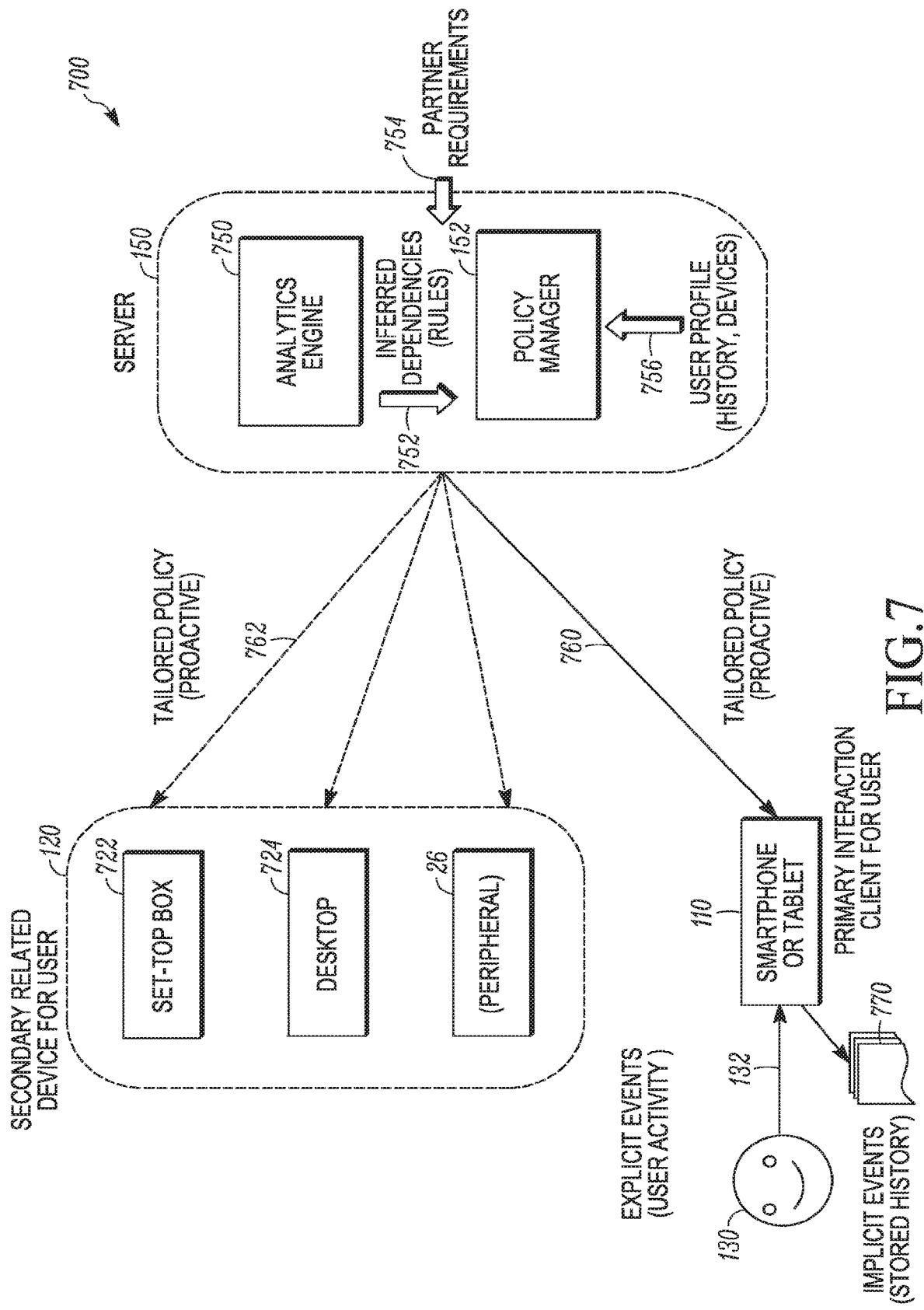
FIG. 7 is an example block diagram of a system according to a possible embodiment.

FIG. 7 is an example block diagram of a system 700, such as the system 100, according to a possible embodiment. The system 700 can include a user device 110, such as a smartphone or tablet, for a user 130. The user 130 can input explicit events 132 that can be stored on the user device 110. The system 700 can include secondary related devices 120 for the user 130. The secondary related devices 120 can include a set-top box 722, a desktop computer 724, a peripheral device 726, and other secondary devices. The system 700 can include a device activity management server 150. The server 150 can include an analytics engine 750 and a policy manager 152. The analytics engine 750 can provide inferred dependencies 752, such as dependency rules, to the policy manager 152. The policy manager 152 can also receive partner requirements 754 and user profile information 756. The user profile information 756 can include a user history of device usage, devices owned or used by the user 130, and other user profile information. The policy manager 152 can use the inferred dependencies 752, the partner requirements 754, user profile information 756, and other information to tailor policies, such as dependency rules 760 and 762, for the user devices 110 and 120. Upon an explicit event 132 of a user 130 input, a user device 110 can evaluate dependency rules 760 corresponding to the explicit event user input to trigger upload of implicit even data 770 and/or explicit event data to a server.

For example, a user can have an option to "like" content of a one-hour drama television show the user watched and a partner ratings service may reward the user for the user's opinion. Without a dependency rule, a user could select and upload the "like" option as an explicit event without watching the show and a partner ratings service for the show would not know that the user did not perform the implicit event of watching the show. However, the partner ratings service can make a partner requirement 754 for a reward policy that lasts for one week. The reward policy can require verification that user watched the show content just prior to entering the "like" option. The policy manager 152 can create a dependency policy or rule either to capture "one hour prior events" that verifies the user watched the show or proves he was doing something else or to capture of all events up to the most recent "play" event or "channel change" event. The dependency rule may expire one week and default to no dependency policy. Also, the policy manager 152 can create a reactive dependency rule policy by inference, after analysis of batch updates indicates that 80% of like events were preceded by a play event, to upload one hour of prior implicit events only if no "play" event was detected in that window.

As another example, if the user attempts to rate the television show, without a dependency rule, only the rating would be uploaded to the ratings service. However, a dependency rule can upload all events in the past hour if there was at least one more rate activity or can upload all events up to the first "play" event for this content item, such as how many times the user viewed the show and how long the user viewed the show. Thus, the ratings service can determine the accuracy of the rating by using the dependency rule.

Figure 8:
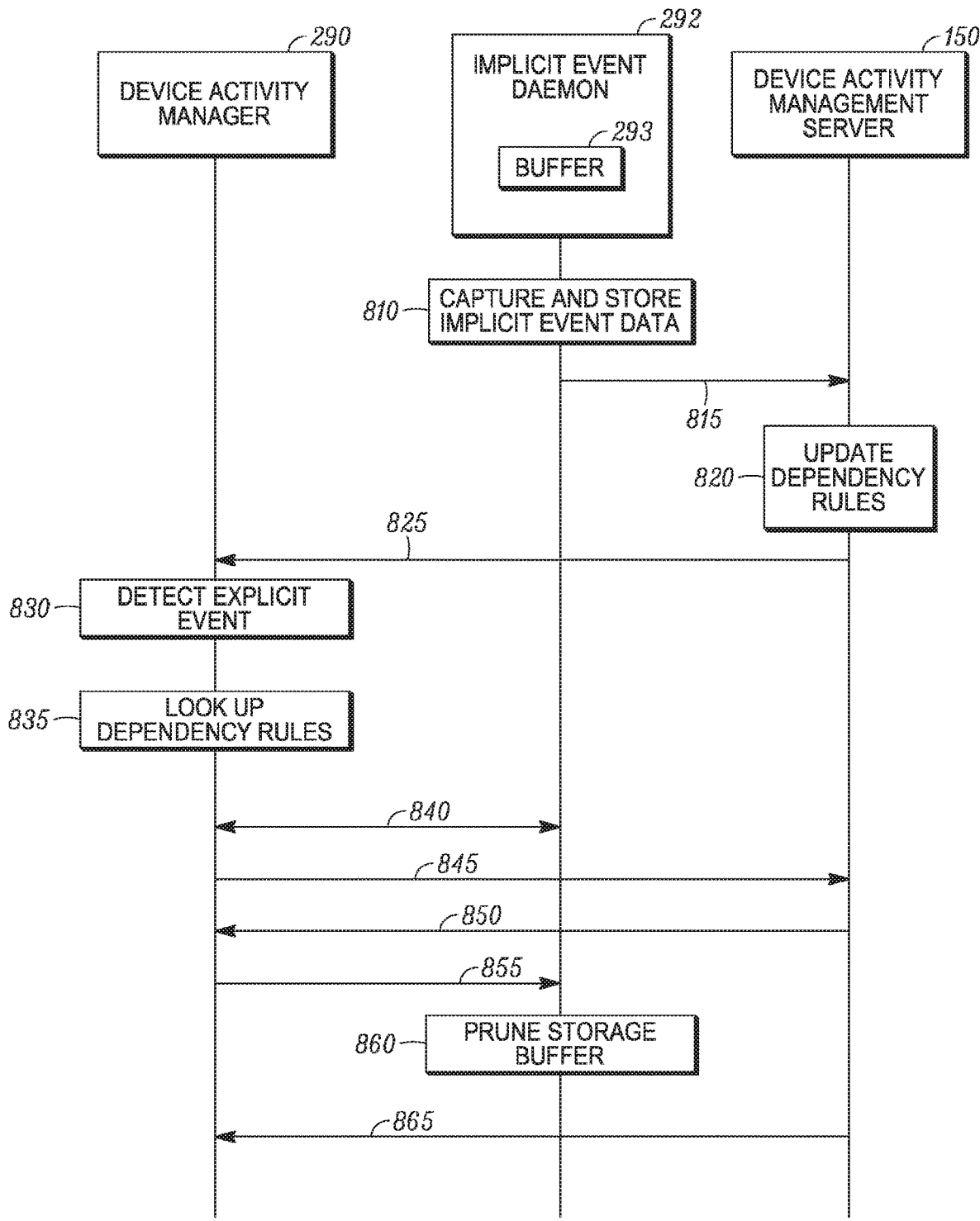
FIG. 8 is an example signal flow diagram of signals between a device activity manager, an implicit event daemon, and a device activity management server according to a possible embodiment.

FIG. 8 is an example signal flow diagram of signals between the device activity manager 290, the implicit event daemon 292, and the device activity management server 150 according to a possible embodiment. At 810, the daemon 292 can periodically capture and store implicit events to a buffer 293. The implicit events can be stored with sequential numbers. At 815, the daemon 292 can periodically batch-upload the implicit events from the buffer 293 to the server 150 and then clear the buffer 293 for a server-based system or can maintain the implicit events for retrieval by the device activity manager 290 for a client-based system. At 820, the server 150 can feed implicit event data to an analytics engine, such as the analytics engine 750, can update dependency rules, and can perform any related actions. At 825, the server 150 can periodically push dependency rules for possible explicit events for a device to the device activity manager 290. At 830, the device activity manager 290 can detect explicit event activity. At 835, the device activity manager 290 can look up dependency rules. The dependency rules can be local to the device activity manager 290 or can be retrieved from the server 150 if they are unknown or expired. At 840, the device activity manager 290 can extract relevant subset of implicit events from the daemon buffer 293. At 845, the device activity manager 290 can upload explicit event data and a corresponding subset of the implicit events to the server 150. At 850, the server 150 can return relevant responses, including follow-on actions if a conflict is detected, to the device activity manager 290. At 855, the device activity manager 290 can send an acknowledgement of successful upload of subset of explicit events to the daemon 292. At 860, the daemon 292 can prune the storage buffer 293 and can update a linked list of sequence 'chunks' uploaded from this batch. At 865, the server 150 can send periodic updates from a policy manager 152 and from an analytics engine 750 to refresh a device activity manager 290 local cache.

According to some embodiments, the dependency rules can provide for when to trigger the transmission of the implicit event data, as opposed to just explicit/implicit event data collection. The dependency rules can be used for validation, security, credential check, consistency, and for other purposes. The dependency rules can be used for selection of a relevant subset of implicit data to upload from a user device to a server. The selection of a relevant subset of implicit data can be based on dependency rules specified by a third party or inferred from historical usage. The selection of a relevant subset of implicit data can be personalized over time to the specific user based on historical or predicted behavior. The selection of a relevant subset of implicit data can also occur over one or more devices associated with a given user.

Embodiments can provide for dependency rule policies to fine tune collection of relevant data. The relevance can be based on dependency of implicit events on explicit events, based on user history, such as whether the user is trusted or not, based on criticality of the data, such as whether it is needed for a current context, and based on coverage, such as across all suitable devices associated with the user. The collection of relevant implicit data can be triggered by an explicit event to better identify users' intentions for immediate application, not just for information gathering for later use.

The dependency rules can be used with a client-service solution with client components on every device associated with a user and with a central server component responsible for collecting data from the various clients and analyzing it. A policy engine can support the creation of dependency rules. The following illustrates a simple template for generating such dependency rules as an example.

```
given
    (activity verb) | (activity target) | (user) | (activity context =
location/time/mood)
    identify relevant subset
       (n prior implicit event-ids) |
       (all prior implicit event-ids UP TO implicitevent of type Y) |
       (all prior implicit event-ids UP TO timestamp T)
    and take upload actions
       for (events in relevant subset) {
          if (event-id corresponds to non-uploaded event) upload event-id
          else upload event data
       }
```

A device-specific daemon 292 can capture and store implicit analytics events on that device. A server-side policy manager 152 can define dependency rules between explicit activity and implicit event streams. A server-side analytics engine 750 can learn user behaviors and infer or improve dependency rules. Also, a device-specific manager 290 can detect occurrence of explicit activity event and attach a relevant subset of implicit events obtained from daemon 292. Also, to do garbage collection, the user device 110 can maintain an index or mark rows for events that have been uploaded right up to when a batch update occurs. The events may not be deleted from storage a priori, such as when they were dynamically updated because the type, timestamp, and other variables may still be needed later for determining a relevant subset of implicit event data for other explicit events that may occur.

Intelligent systems can 'learn' about the user over time and use the acquired knowledge to make better decisions, creating more personalized conditions for collection and upload of implicit event data. To elaborate on a particular example, in a cheat-proofing case, a system may validate Alice's "check-in" activity the first 100 times to verify her honesty, but if all 100 instances validate successfully, it may then defer or stop uploading implicit events for subsequent check-ins on trust, thus reducing network and processing costs. Embodiments can address the need for timely and efficient upload of implicit event data by using of dependency rules to determine the "relevant subset" of the collected data that is useful for the system to correctly respond to each explicit activity. The system can then limit uploads to include only the relevant subset of data when an explicit activity is performed rather than following the naïve approach of uploading all data. The association of the implicit and explicit events via dependency rules in particular can allow for the nature of the relevant subset to change in response to, for example, updates to partner requirements and observation of the users' behavior. To continue to elaborate on the cheat-proofing example above, a partner may initially require that Alice's explicit "check-in" always be validated by uploading a set of implicit events related to that "check-in," but later relax that requirement so that the uploading can be deferred after Alice's honesty has been verified 100 consecutive times. To effect this change in requirements, only a modification to the dependency rule(s) associated with the explicit "check-in" event would be necessary. Thus, embodiments can enable the upload of implicit event data in a timely, efficient, correct, and highly flexible manner.

Embodiments can increase communication device performance. For example, explicit events, such as user inputs, may require correlating implicit events, such as context, to render accurate results and improve communication device responsiveness. An aggressive approach can upload implicit events in real-time, such as continuously, which adds overhead to a communication device processor to package and upload events and adds overhead to a network by using additional bandwidth. A "lazy" approach can upload implicit events in batches periodically. The lazy approach reduces processing and network overheads, but adds latency to user responses and may negatively impact user experience and utility of the process. Embodiments can improve communication device performance by reducing overheads and can increase response time for a better user experience.

The methods of this disclosure may be implemented on a programmed processor. However, the operations of the embodiments may also be implemented on non-transitory machine readable storage having stored thereon a computer program having a plurality of code sections that include the blocks illustrated in the flowcharts, or a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method comprising:
    receiving, at a computing device, an indication that a user of the computing device has entered a review of first media content;
    verifying, by the computing device and responsive to the indication that the user has entered the review of the first media content, whether the user consumed the first media content prior to entering the review;
    responsive to verifying that the user consumed the first media content prior to entering the review, uploading, from the computing device, data including the review of the first media content; and
    responsive to failing to verify that the user consumed the first media content prior to entering the review, causing the computing device to refrain from uploading the data including the review of the first media content.

2. The method of claim 1, wherein the review of the first media content comprises at least one of a rating, vote, and comment associated with the first media content.

3. The method of claim 1, wherein the verifying whether the user consumed the first media content prior to entering the review is based at least in part on history data associated with playback of media content by the computing device.

4. The method of claim 1, wherein the review of the first media content entered by the user is entered as an input at the computing device.

5. The method of claim 1, further comprising:
    receiving, at the computing device, an indication that the user has entered a review of second media content that is different from the first media content; and
    based on verifying that the user consumed the first media content prior to entering the review, uploading, from the computing device, data including the review of the second media content without verifying whether the user consumed the second media content prior to entering the review of the second media content.

6. The method of claim 1, wherein the first media content comprises video content and verifying whether the user consumed the first media content comprises verifying whether the computing device played back at least a threshold portion of the video content within a certain time period before entering the review.

7. The method of claim 1, wherein the first media content comprises audio content and verifying whether the user consumed the first media content comprises verifying whether the computing device played back at least a threshold portion of the audio content within a certain time period before entering the review.

8. The method of claim 1, wherein the verifying whether the user consumed the first media content prior to entering the review comprises verifying, based on a browser history associated with the user, whether the user accessed a web resource corresponding to the first media content within a certain time period before entering the review.

9. The method of claim 1, wherein the verifying whether the user consumed the first media content prior to entering the review comprises verifying, based on a history of playback events, whether the computing device or a secondary device related to the user played back the first media content.

10. The method of claim 1, wherein the verifying whether the user consumed the first media content prior to entering the review further comprises verifying whether the computing device played back the first media content for at least a predetermined duration of time; and
    wherein uploading data including the review of the first media content further comprises uploading data including a duration of time that the computing device played back the first media content.

11. A system, comprising:
    one or more processors;
    a memory coupled to the one or more processors and storing instructions that, when executed by the one or more processors, cause the system to:
        receive an indication that a user has entered a review of first media content;
        responsive to the indication that the user has entered the review of the first media content, verify whether the user consumed the first media content prior to entering the review;
        responsive to verification that the user consumed the first media content prior to entering the review, upload data including the review of the first media content; and
        responsive to a failure to verify that the user consumed the first media content prior to entering the review, cause the system to refrain from uploading the data including the review of the first media content.

12. The system of claim 11, wherein the review of the first media content comprises at least one of a rating, vote, and comment associated with the first media content.

13. The system of claim 11, wherein the verification of whether the user consumed the first media content prior to entering the review is based at least in part on history data associated with playback of media content by the system.

14. The system of claim 11, wherein the review of the first media content entered by the user is entered by the user at an input device of the system.

15. The system of claim 11, wherein the stored instructions, when executed by the one or more processors, further cause the system to:
   receive an indication that the user has entered a review of second media content that is different from the first media content; and
   based on verification that the user consumed the first media content prior to entering the review, upload data including the review of the second media content without verification of whether the user consumed the second media content prior to entering the review of the second media content.

16. The system of claim 11, wherein the first media content comprises video content and verification of whether the user consumed the first media content comprises verification of whether the system played back at least a threshold portion of the video content within a certain time period before entering the review.

17. The system of claim 11, wherein the first media content comprises audio content and verification of whether the user consumed the first media content comprises verification of whether the system played back at least a threshold portion of the audio content within a certain time period before entering the review.

18. The system of claim 11, wherein the verification of whether the user consumed the first media content prior to entering the review comprises verification of, based on a browser history associated with the user, whether the user accessed a web resource corresponding to the first media content within a certain time period before entering the review.

19. The system of claim 11, wherein the verification of whether the user consumed the first media content prior to entering the review comprises verification of, based on a history of playback events, whether the system or a secondary device related to the user played back the first media content.

20. The system of claim 11, wherein the verification of whether the user consumed the first media content prior to entering the review further comprises verification of whether the system played back the first media content for at least a predetermined duration of time; and
   wherein uploading data including the review of the first media content further comprises uploading data including a duration of time that the system played back the first media content.

21. A non-transitory computer-readable medium storing instructions that, when executed by one or more processors, cause a computing device to:
   receive an indication that a user has entered a review of first media content;
   responsive to the indication that the user has entered the review of the first media content, verify whether the user consumed the first media content prior to entering the review;
   responsive to verification that the user consumed the first media content prior to entering the review, upload data including the review of the first media content; and
   responsive to a failure to verify that the user consumed the first media content prior to entering the review, cause the computing device to refrain from uploading the data including the review of the first media content.

22. The non-transitory computer-readable medium of claim 21, wherein the review of the first media content comprises at least one of a rating, vote, and comment associated with the first media content.

23. The non-transitory computer-readable medium of claim 21, wherein the verification of whether the user consumed the first media content prior to entering the review is based at least in part on history data associated with playback of media content by the computing device.

24. The non-transitory computer-readable medium of claim 21, wherein the review of the first media content entered by the user is entered at an input device coupled to the computing device.

25. The non-transitory computer-readable medium of claim 21, wherein the stored instructions, when executed by the one or more processors, further cause the computing device to:
   receive an indication of the user entering a review of second media content that is different from the first media content; and
   based on verification that the user consumed the first media content prior to entering the review, upload data including the review of the second media content without verification of whether the user consumed the second media content prior to entering the review of the second media content.

26. The non-transitory computer-readable medium of claim 21, wherein the first media content comprises at least one of video content and audio content and verification of whether the user consumed the first media content comprises verification of at least one of whether the computing device played back at least a threshold portion of the video content within a certain time period before entering the review and whether the computing device played back at least a threshold portion of the audio content within a certain time period before entering the review.

27. The non-transitory computer-readable medium of claim 21, wherein the verification of whether the user consumed the first media content prior to entering the review comprises verification of, based on a browser history, whether the user accessed a web resource corresponding to the first media content within a certain time period before entering the review.

28. The non-transitory computer-readable medium of claim 21, wherein the verification of whether the user consumed the first media content prior to entering the review comprises verification of, based on a history of playback events, whether the computing device or a secondary device related to the user played back the first media content.

29. The non-transitory computer-readable medium of claim 21, wherein the verification of whether the user consumed the first media content prior to entering the review further comprises verification of whether the computing device played back the first media content for at least a predetermined duration of time; and
   wherein the uploading data including the review of the first media content further comprises uploading data including a duration of time that the computing device played back the first media content.

* * * * *